July 2, 1957  R. E. ANDERSON  2,797,565
BUTTER DISH WITH CUTTING EDGE
Filed Nov. 19, 1954  2 Sheets-Sheet 1

INVENTOR.
ROBERT E. ANDERSON
BY
McMorrow, Berman + Davidson
ATTORNEYS

July 2, 1957  R. E. ANDERSON  2,797,565
BUTTER DISH WITH CUTTING EDGE
Filed Nov. 19, 1954  2 Sheets-Sheet 2

INVENTOR.
ROBERT E. ANDERSON
BY
McMorrow, Berman + Davidson
ATTORNEYS

United States Patent Office 2,797,565
Patented July 2, 1957

2,797,565

BUTTER DISH WITH CUTTING EDGE

Robert E. Anderson, Champaign, Ill.

Application November 19, 1954, Serial No. 470,056

3 Claims. (Cl. 65—60)

This invention relates to improvements in dishes for food articles, and more particularly to a dish adapted to enclose a food article, such as a stick of butter and being provided with means for cutting slices thereof when desired.

The main object of the invention is to provide a novel and improved covered dish for a food article, said dish being simple in construction, being neat in appearance, and being easy to clean.

A further object of the invention is to provide an improved dish for butter or the like, said dish being provided with a cover having means thereon for slicing off portions of the foot article contained in the dish, when desired, for example, for cutting off pats of butter, the dish being inexpensive to fabricate, being durable in construction, and being relatively compact in size.

Further objects and advantages of the invention will become apparent from the following description and claims, and from the accompanying drawings, wherein:

Figure 5:
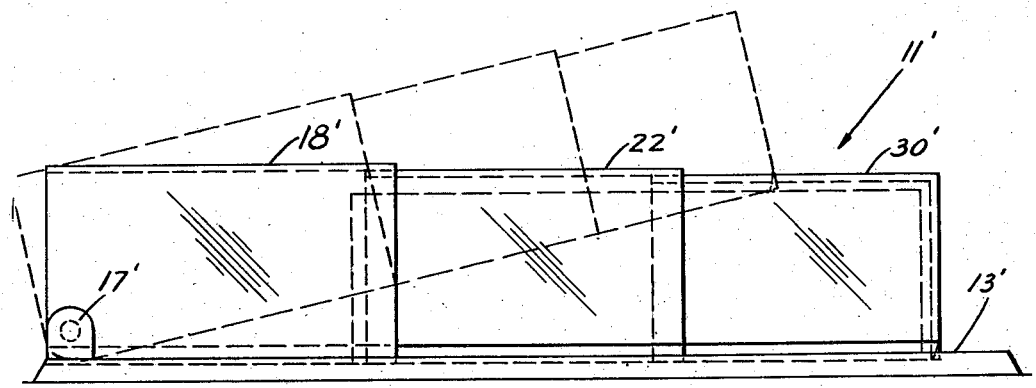

Figure 5 ist a side elevational view of a modified form of dish constructed in accordance with the present invention.

Figure 6:
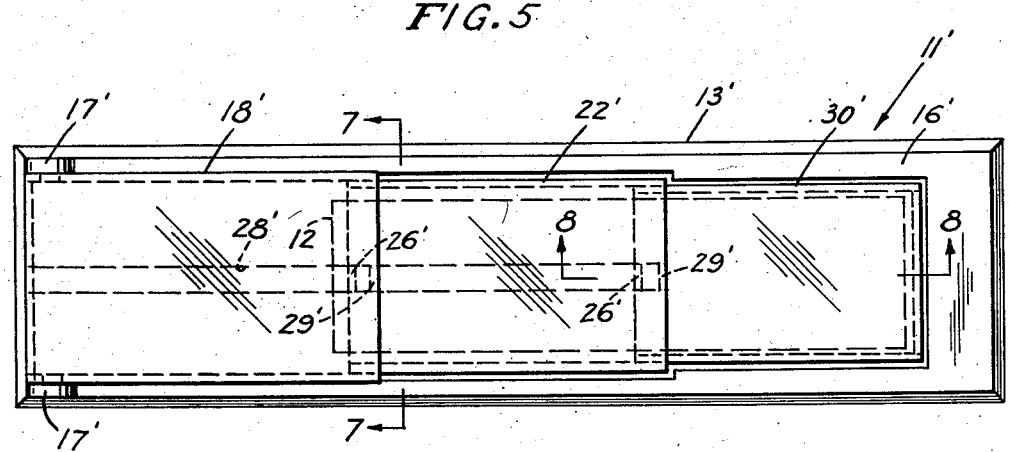

Figure 6 is a top plan view of the dish of Figure 5.

Figure 7:
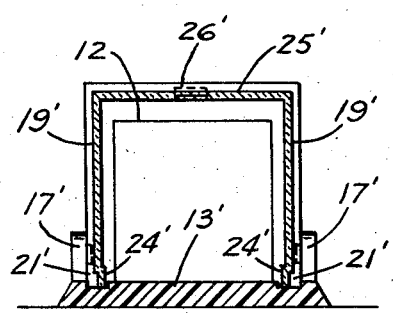

Figure 7 is a transverse vertical cross sectional view taken on the line 7—7 of Figure 6.

Figure 8:
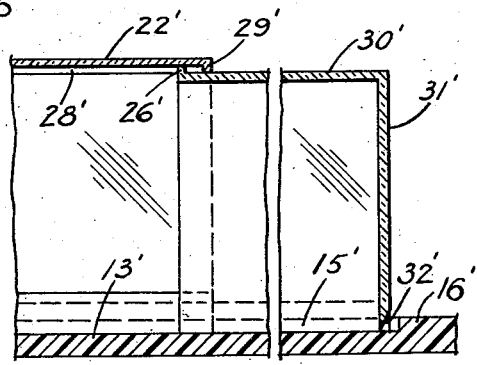

Figure 8 is an enlarged vertical cross sectional detail view taken on the line 8—8 of Figure 6.

Figure 1:
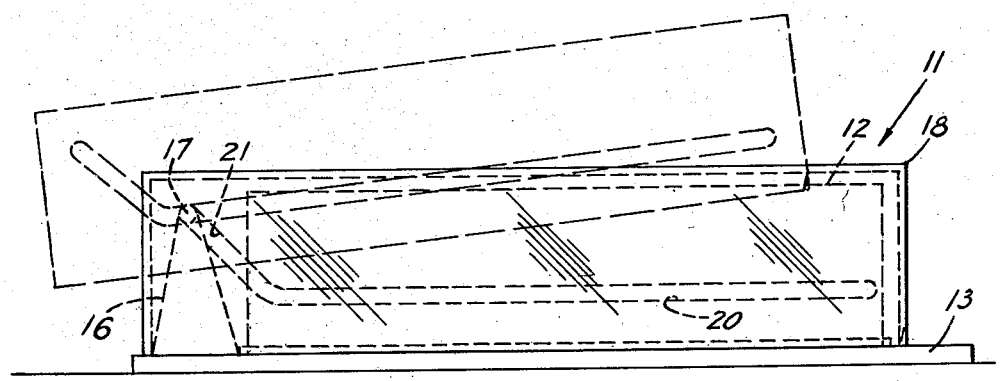
Figure 1 is a side elevational view of one form of improved dish constructed in accordance with the present invention.
Figure 2:
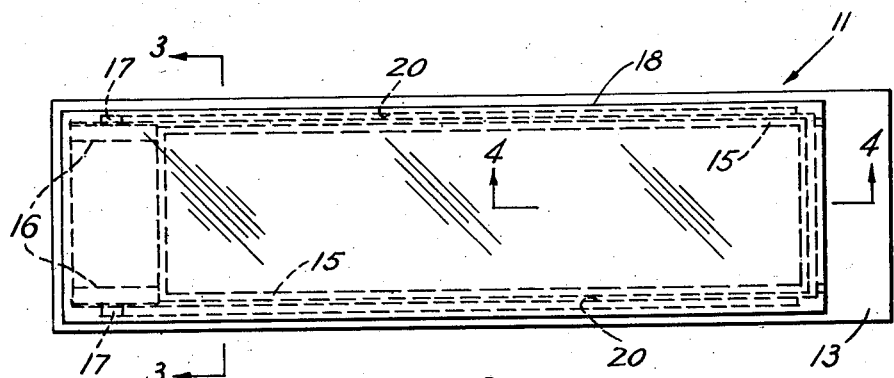
Figure 2 is a top view of the improved dish shown in Figure 1.

Referring to the drawings, and more particularly to Figures 1 to 4, 11 generally designates an improved dish according to the present invention, adapted to receive a stick of butter 12. The dish 11 comprises a tray member 13 which may be generally rectangular in shape, as shown, said tray member being formed with a relatively low upstanding rib 15 defining a recess therein, the rib extending in a generally rectangular pattern, as shown in Figure 2, and the recess thus defined being such as to receive a stick of butter 12.

Integrally formed on the rear portion of the tray member 13 are the upstanding triangular lugs 16, 16 which are arranged parallel to each other and which are formed with the outwardly projecting, opposite pin elements 17, 17 at their top ends. Designated at 18 is a box-like cover member having side walls 19, 19, said side walls being formed on their inner surfaces with the longitudinal grooves 20, said grooves having the upwardly inclined rear portions 21, as shown in Figure 1. The respective pin elements 17, 17 are slidably received in the grooves 20, 21 formed in the respective side walls 19, 19, whereby the box-like cover member 18 is pivotally and slidably connected to the upstanding lugs 16.

Figure 3:
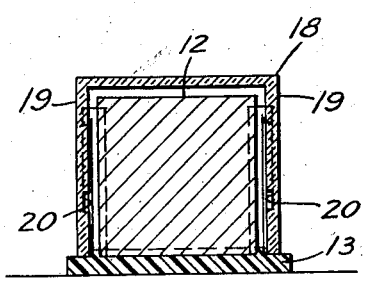
Figure 3 is a transverse vertical cross sectional view taken on the line 3—3 of Figure 2.
Figure 4:
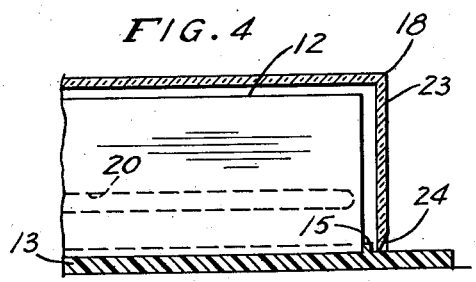
Figure 4 is a vertical cross sectional view taken on the line 4—4 of Figure 2.

As shown in Figures 3 and 4, the box-like housing 18 is shaped to fit over the upstanding rib 15, whereby the cover member 18 may be disposed in protective relationship to the stick of butter 12 received in the recess defined by the rib 15. When thus positioned, the pin elements 17, 17 are located in the upper ends of the inclined portions 21 of the grooves in the side walls of the cover 18. As will be readily apparent, the forward portion of the cover 18 may be swung upwardly, as shown in dotted view in Figure 1 to expose the stick of butter 12 supported on the tray 13.

The transverse forward wall 23 of the box-like housing 18 is provided wtih the sharpened bottom edge 24 which may be employed as a cutting blade to substantially sever forward portions of the stick of butter 12 when desired. Thus, for example, when the cover member 18 is arranged in the position thereof shown in dotted view in Figure 1, the forward portion of the stick of butter 12 may be substantially severed by depressing the front end wall 23 of the cover 18 on the stick of butter, whereby a pat of butter will be substantially sliced off the stick. Additional pats of butter may be similarly substantially sliced off by successively moving the cover member 18 rearwardly, such movement being guided by the cooperating pin elements 17, 17 and grooves 20.

Referring now to the form of the invention shown in Figures 5, 6, 7 and 8, the improved dish is designated generally at 11' and comprises a tray 13' formed with a recess 15' thus defining a thickened marginal portion 16' extending around the perimeter of the tray 13'.

The recess 15' is shaped to receive a stick of butter 12 or similar food article, such as cheese or other relatively soft food material.

The tray 13' is formed at its rear end with the upstanding corner lugs 17', 17'. Designated at 18' is a generally rectangular, elongated sleeve element having the side walls 19', 19', said side walls being pivotally connected at their lower rear corner portions to the upstanding lugs 17', 17'. The cover element 18' is formed at the lower marginal portions of its side walls 19' with the inwardly projecting flange elements 21', 21', as shown in Figure 7. Designated at 22' is a second generally rectangular housing segment which is slidably received inside the housing segment 18' and which is formed with the inwardly offset flange elements 24', 24' adapted to slidably engage over the inwardly projecting flange elements 21' of the side walls 19', 19' of cover element 18'. The top wall 25' of the cover segment 22' is formed with an upstanding projection 26', said projection being located at the intermediate portion of the rear edge of said top wall, and being slidably received in a groove 28' formed in the underside of the top wall of the cover segment 18'. The top wall of cover segment 18' is formed at the forward end of the groove 28' therein with a transverse stop rib 29' which limits the forward movement of the upstanding stop lug 26' and prevents the intermediate cover segment 22' from being detached from the main cover segment 18'.

Designated at 30' is a further cover segment which is slidably interlocked with the intermediate cover segment 22' in the same manner as said intermediate cover segment is slidably interlocked with the main cover segment 18'. The transverse forward end wall 31' of the cover segment 30' is formed with a sharpened bottom edge 32', as shown in Figure 8.

The recess 15' is shaped to receive the respective cover segments when they are in extended relationship, as shown in Figure 6.

In using the dish, a stick of butter or similar article may be disposed in the recess 15' and will be covered by the cover segments 18', 22' and 30' in the manner illustrated in Figure 6. When it is desired to cut off a tab of butter or slice off the forward portion of any other food article placed in the dish, the cover elements are elevated in the manner shown in dotted view in Figure 5, and the sharpened transverse front wall 31' of the forward section 30' is depressed on the food article to substantially cut off the forward portion of the food article, in a manner similar to that described in connection with the previously described embodiment of the invention shown in Figures 1 to 4.

Obviously, as the food article becomes shortened in length by the removal of successive slices therefrom, the cover segments may be telescoped inwardly with respect to each other to shorten the length of the cover and to slice the remainder of the stick of butter or other food article carried on the tray.

While certain specific embodiments of an improved dish for food articles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a dish of the character described, a tray member adapted to support food material, a box-like cover member having side walls and a transverse front end wall, and means pivotally and slidably connecting the rear end portion of said cover member to said tray member, the bottom edge of said transverse front end wall being sharpened to define a cutting blade, whereby food material disposed on the forward portion of said tray member may be substantially sliced by depressing said front end wall thereon.

2. In a dish of the character described, a tray member adapted to support food material, said tray member having a relatively low thckened marginal portion defining a recess therein to receive food material, a box-like cover member having side walls and a transverse front end wall, said cover member being formed to substantially overlie said recess, and means pivotally and slidably connecting the rear end portions of the side walls of said cover member to said tray member, the bottom edge of said transverse front end wall being sharpened to define a cutting blade, whereby food material disposed on the forward portion of said tray member may be substantially sliced by depressing said front end wall thereon.

3. In a dish of the character described, a tray member shaped to receive a stick of butter or the like thereon, said tray member having a relatively low upstanding marginal portion defining a recess thereon to receive a stick of butter, a box-like cover member having side walls and a transverse front end wall, said cover member being formed to substantially overlie said recess, and means pivotally and slidably connecting the rear end portions of said cover member to said tray member, the bottom edge of said transverse front end wall being sharpened to define a cutting blade whereby the forward portion of a stick of butter disposed longitudinally on said tray member and projecting forwardly may be substantially sliced off by depressing said front end wall thereon.

References Cited in the file of this patent

UNITED STATES PATENTS

| | | |
|---|---|---|
| 154,123 | Chadwick | Aug. 18, 1874 |
| 634,330 | Gans | Oct. 3, 1899 |
| 1,196,526 | Danner | Aug. 29, 1916 |
| 1,332,035 | Golby | Feb. 24, 1920 |
| 1,679,004 | Pinkel et al. | July 31, 1928 |
| 1,938,527 | Marelli | Dec. 5, 1933 |
| 1,981,016 | Wooddell | Nov. 20, 1934 |
| 2,080,283 | Lowenfels | May 11, 1937 |

FOREIGN PATENTS

| | | |
|---|---|---|
| 84,043 | Switzerland | June 12, 1919 |
| 415,160 | Great Britain | Aug. 23, 1934 |